Dec. 25, 1962   N. L. DU BOIS   3,070,306
MULTIPLYING CIRCUIT
Filed Sept. 11, 1959   2 Sheets-Sheet 1
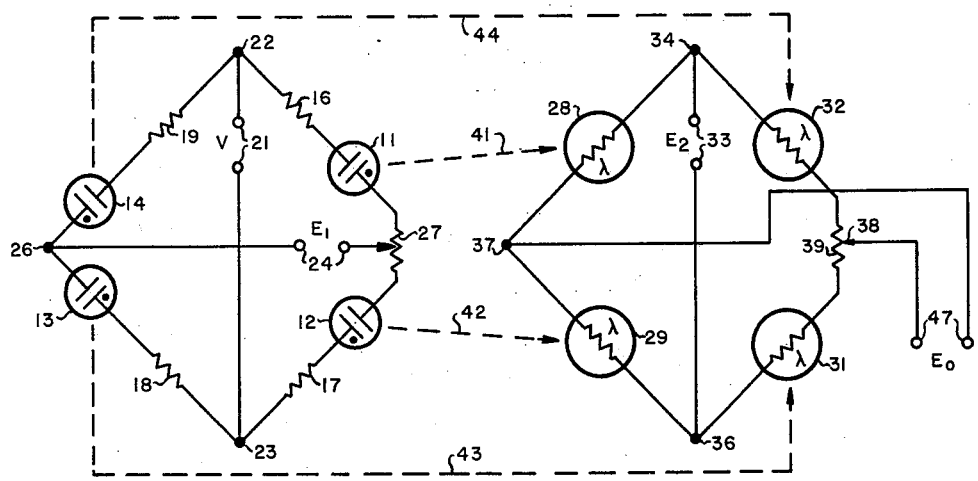
Fig. 1
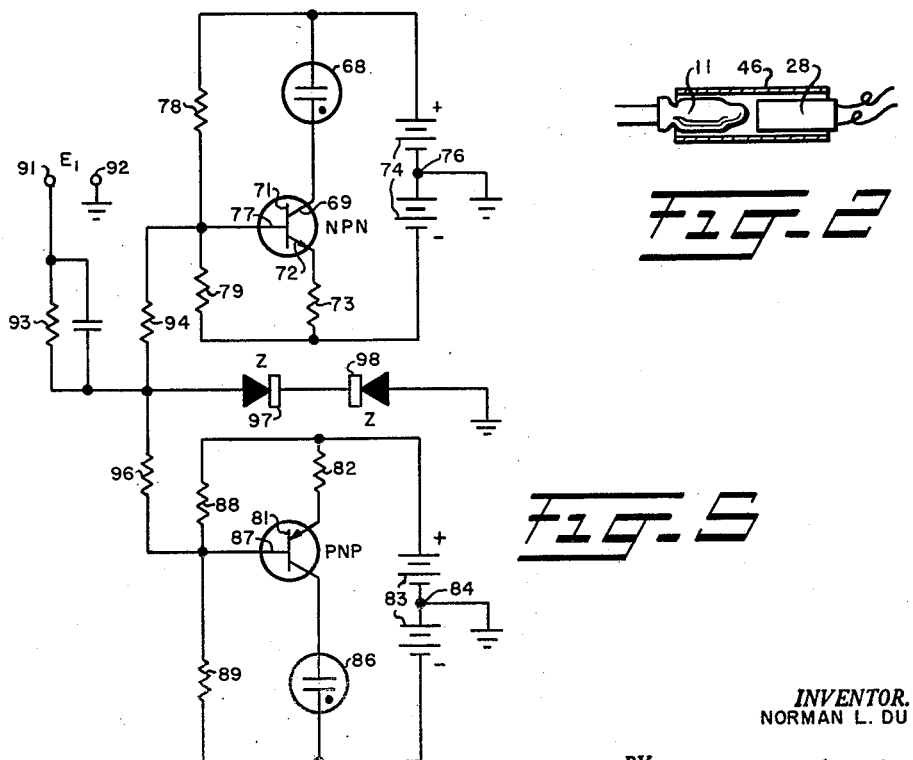
Fig. 2
Fig. 3
INVENTOR.
NORMAN L. DU BOIS
BY *H. A. Mackey*
ATTORNEY Dec. 25, 1962 N. L. DU BOIS 3,070,306
MULTIPLYING CIRCUIT
Filed Sept. 11, 1959 2 Sheets-Sheet 2
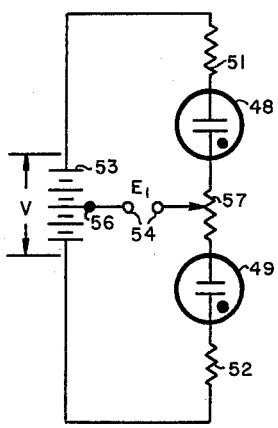
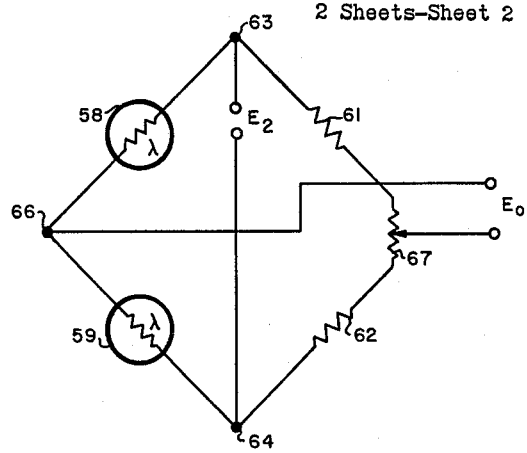
Fig. 3  Fig. 4
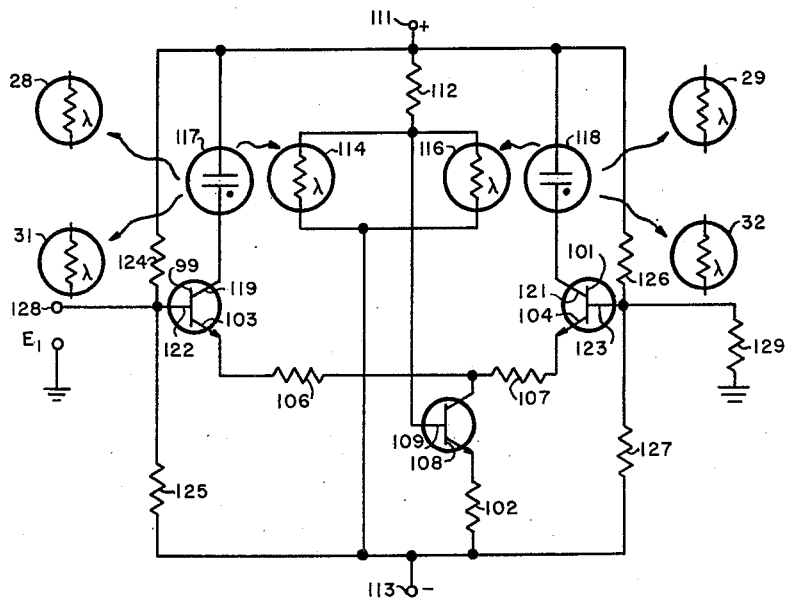
Fig. 6
INVENTOR.
NORMAN L. DU BOIS
BY *H. S. Mackey*
ATTORNEY

United States Patent Office 3,070,306
Patented Dec. 25, 1962

3,070,306
MULTIPLYING CIRCUIT
Norman L. Du Bois, Thornwood, N.Y., assignor to General Precision Inc., a corporation of Delaware
Filed Sept. 11, 1959, Ser. No. 839,388
7 Claims. (Cl. 235—179)

This invention relates to electrical circuits for mathematical computations, and specifically relates to circuits performing the operation of multiplication. The circuit falls in the general category of balanced modulators.

The invention provides a true modulator which makes use of light sources and photoconductive cells arranged in two bridge networks. Two or four small lamps are arranged in a network so that they are differentially energized in pairs by an input signal, and emit beams of light having differences in intensities representing the signal. Two or four photoconductive cells are arranged in a second, electrically separate network, and are positioned so that they are illuminated by the light beams from the lamps. A second input signal is applied to one pair of terminals of this network and the instrument output is taken from the other pair of terminals. This output is proportional to the product of the two input signals.

The instrument is direct coupled, so that the frequency ranges of both input signals extend down to and include zero frequency or direct current. The upper frequency limits of the first and second input signals depend only on the frequency limitations of the lamps and photoconductive cells respectively.

When the load has high impedance this circuit has an output potential magnitude which is linearly proportional to the product of the two input signal magnitudes. Since the circuit elements are balanced, input frequencies do not appear in the output. The circuit is a true modulator, and only sum and difference frequencies, without internally generated harmonics, appear in the output.

The principal purpose of this invention is to provide an improved multiplying circuit.

A further understanding of this invention may be secured from the detailed description and accompanying drawings, in which:

FIGURE 1 depicts one embodiment of the invention including a four-glow-lamp bridge and a four-photocell bridge.

FIGURE 2 illustrates a mount for a lamp and cell.

FIGURE 3 depicts a two-glow-lamp bridge.

FIGURE 4 depicts a two-photocell bridge.

FIGURE 5 illustrates one way of increasing the linearity of glow lamp current employing transistors.

FIGURE 6 illustrates another way of increasing the linearity of glow lamp current employing a differential amplifier circuit.

Referring now to FIG. 1, elements 11, 12, 13 and 14 represent similar glow lamps such as the type NE-2 manufactured by General Electric Company. This is a miniature neon glow discharge lamp. Within a selected range of lamp currents the relation of voltage across the lamp to current through it is positive and linear, and the light emitted is substantially linearly proportional to the lamp current. Each lamp is provided with a series ballast resistor, the four resistors being numbered 16, 17, 18 and 19, to stabilize operation. The four lamps are operated from a power source represented by terminals 21 having a high enough potential to start the lamps and sufficient power capacity to maintain them in operation. In this embodiment the source supplies direct current. The terminals 21 are respectively connected to the bridge junctions 22 and 23. An input signal source is represented by terminals 24, which are respectively connected to the other pair of bridge junctions, one of which is the junction 26. A small potentiometer 27 is placed at the other junction for the purpose of balancing the bridge impedances. This network, including the four lamps with their ballast resistors, and the two pairs of electrical terminals constitutes the balanced lamp bridge.

A second balanced bridge is provided, electrically separated from the first bridge. The second bridge contains four photoconductive cells 28, 29, 31 and 32 connected in a ring. These cells are similar, and may be of any type such as, for example, the type employing cadmium selenide, in which the conductivity is closely linearly proportional to the amount of light falling on the cell. A second input signal source is represented by the pair of terminals 33, which are respectively connected to the bridge junctions 34 and 36. Output is taken from the other bridge junctions 37 and 38, the exact position of junction 38 being adjustable by the small balancing potentiometer 39.

The lamp bridge and photoconductive cell bridge are connected only by four light paths indicated by the dashed lines 41, 42, 43 and 44. These paths are so arranged that the light from each lamp falls only on a single selected photoconductive cell. In this example the light of each lamp falls only on that photoconductive cell, the light coupling of which is indicated in the drawing by a dashed line. Thus the light of the glow lamp 11 falls only on the photoconductive cell 28 and none of it reaches any of the cells 29, 31 and 32. FIG. 2 shows one way in which this may be accomplished. The glow lamp 11 and photoconductive cell 28 are enclosed in an opaque tube 46 so that all of the lamp light is confined within the tube.

In the operation of this circuit, the potentiometers 27 and 39 are initially adjusted, with zero signals applied at terminals 24 and 33, so that each of the bridges is balanced. When input signals $E_1$ and $E_2$ are applied at terminals 24 and 33 respectively, the output potential, $E_0$, at terminals 47 is proportional to a good approximation, to the product of the input signal potential magnitudes $E_1$ and $E_2$. It is desirable that the glow lamps be operated only over the linear portion of the characteristic, in which the glow resistance is independent of current, and that the load connected to terminls 47 should have very high impedance. The above relation is formulated:

$$E_0 = \frac{E_1 E_2}{V} \qquad (1)$$

in which V is the direct potential at terminals 21.

The use of glow lamps imposes certain restrictions on the potentials and currents applied to the lamp network. A glow lamp operated on direct current requires a starting voltage higher than the maintenance voltage, and its discharge will become unstable if the current should fall below a certain value. Therefore the magnitudes of the quantities V and $E_1$ must be kept within certain ranges.

With these limitations in mind, however, the potential V applied to terminals 21, which may be termed the keep-alive potential, may be alternating instead of direct. Additionally, the potential V, whether constant direct or modulated direct potential, may be considered to constitute a third input signal and not merely a scale factor. Thus the device can be employed to multiply two quantities, to divide one quantity by another, or to multiply two quantities and divide by a third.

This relation, as formulated in Equation 1, is developed in two parts, first by showing the relation between the input electric signals and the neon light intensities and second, by showing the dependence of the output signal on the light intensities and on the input signal $E_2$.

Assume that the resistances, R, of resistors 16, 17, 18, and 19 are equal and that the neon lamp resistances are negligibly small. To simplify derivation let the instantaneous polarities of terminals 23 and 22 due to V be positive and negative, respectively, and of terminals 27 and 26 due to potential $E_1$ be positive and negative, respectively. Then the currents through the four neon lamps are:

$$i_{11} = i_{13} = \frac{1}{2R}(V + E_1) \qquad (2)$$

$$i_{12} = i_{14} = \frac{1}{2R}(V - E_1) \qquad (3)$$

The light output, $\lambda$, of each of these neon lamps being proportional to current, $$\lambda_{11} = \lambda_{13} = \frac{K}{2R}(V + E_1)$$

$$\lambda_{12} = \lambda_{14} = \frac{K}{2R}(V - E_1) \qquad (4)$$

in which K is a proportionality factor.

In the photoconductive cell bridge, the potential, $e_1$, across cell 29 is $$e_1 = E_2 \frac{R_{29}}{R_{28} + R_{29}} \qquad (5)$$

Similarly, the potential $e_2$ across cell 31 is $$e_2 = E_2 \frac{R_{31}}{R_{32} + R_{31}} \qquad (6)$$

Since operation by light from the lamp bridge is symmetrical in pairs, at any instant $$R_{29} = R_{32} \text{ and } R_{28} = R_{31} \qquad (7)$$

so that $$e_2 = E_2 \frac{R_{28}}{R_{28} + R_{29}} \qquad (8)$$

also $$E_0 = e_1 - e_2 = E_2 \frac{R_{29} - R_{28}}{R_{29} + R_{28}} \qquad (9)$$

Converting to conductances, $$E_0 = \frac{g_{28} - g_{29}}{g_{28} + g_{29}} E_2 \qquad (10)$$

The light-sensitive cells of FIGURE 1 having conductivities proportional to the light intensities exciting them, $$g_{29} = g_{32} = K'\lambda_{12} = K'\lambda_{14}$$

$$g_{28} = g_{31} = K'\lambda_{11} = K'\lambda_{13} \qquad (11)$$

Combining (4) and (11)

$$g_{29} = \frac{KK'}{2R}(V - E_1)$$

$$g_{28} = \frac{KK'}{2R}(V + E_1) \qquad (12)$$

Combining (10) and (12)

$$E_0 = \frac{E_1 E_2}{V} \qquad (13)$$

In the operation of the circuit of FIGURE 1, assuming that the polarity of V, terminals 21, is such that 23 is positive with respect to 22, that the polarity of $E_1$, terminals 24, is such that 27 is positive with respect to 26, and the polarity of $E_2$, terminals 33, is such that 34 is positive with respect to 36 (at least instantaneously), then lamps 11 and 13 increase in illumination, while lamps 12 and 14 decrease in illumination. As a direct result, the resistances of resistors 28 and 31 decrease, while the resistances of resistors 29 and 32 increase resulting in an increase in voltage at 37 and a corresponding decrease in voltage at 39. Further changes in voltage divisions in the same directions along the path 34, 28, 37, 29 and 36 and along the path 34, 32, 39, 31 and 36 result from further changes in the same direction of the voltage $E_1$, resulting in proportional increase of the output voltage $E_0$. This voltage, $E_0$, is also increased proportionally to $E_2$ and thus to the product of $E_1$ and $E_2$.

If in either bridge the two apex terminal pairs be interchanged, the output is described by the equation but with the sign changed. If the light paths be changed so that light from opposite-arm lamps falls on adjacent-arm photoconductive cells, or the reverse, zero output signal is obtained.

In place of the lamp network of FIG. 1 a simple network employing only two glow lamps can be used as shown in FIG. 3. In this embodiment one of the glow lamps is arranged to illuminate two opposite photoconductive cells such as cells 28 and 31, FIG. 1, and the other lamp is arranged to illuminate the two remaining cells. When a two-cell light-receiving network is employed such as will be described hereinafter, each glow-lamp is arranged to illuminate a single photoconductive cell.

In FIG. 3 glow lamps 48 and 49 are provided with ballast resistors 51 and 52. The potential V is provided by a center-tapped direct current source, represented by the battery 53. The input signal $E_1$ is applied at terminals 54 between the battery center tap 56 and the small balancing potentiometer 57 connected between the glow lamps 48 and 49. When this glow lamp network is substituted in FIG. 1 for the 4-lamp network, Equation 1 still applies except that the potential of the signal V is reduced by a small constant approximately equal to the keep-alive potential of the glow lamp.

FIG. 4 depicts a simple photoconductive cell network requiring only two cells, 58 and 59. The positions formerly occupied by the other two cells are taken by the two equal resistors 61 and 62. The input signal $E_2$ is applied between the apex junctions 63 and 64. The output signal $E_0$ is taken from the apex junction 66 and a balancing potentiometer 67 at the fourth apex. When this network is used with the 2-lamp network of FIG. 3, each cell is illuminated only by its own associated lamp. When used with the 4-lamp network of FIG. 1, each cell is simultaneously illuminated by two lamps which are on opposite sides of the network and have light outputs which vary in concert.

If the glow lamps be driven through too wide a range their internal resistances will not remain constant and the linear relations of the equation will not apply in the operation of the circuits. Moreover, if during a cycle of signal input a glow lamp current be driven below its discharge maintenance value, the flow of the lamp will be extinguished. The lamp then requires an increased potential for reignition. Such abnormal operation of a circuit designed for continuous glow lamp operation prevents its use under such conditions as an accurate computing circuit.

A circuit intended to preserve linearity between lamp current and input signal potential, even in the non-linear portion of the lamp voltage-current characteristic, is depicted in FIG. 5. This circuit also contains limiters to prevent any input signal voltage variations from extinguishing either glow lamp. The circuit depends for its linear operation on the constancy, in some transistor circuits, of collector current at varying collector voltages. The similar characteristic of pentode tubes makes them suitable for this use in place of the transistors.

In FIG. 5, one terminal of a glow lamp 68 is connected to the collector 69, of an NPN transistor 71. The emitter, 72, is connected through a resistor 73 to the negative terminal of a source of direct current represented by battery 74, the positive terminal of which is connected to the other terminal of the glow lamp 68. An intermediate tap 76 of the battery is grounded. The transistor base 77, is biased by means of resistors 78 and 79 connected to the battery terminals.

A second circuit which is similar to that just described but of oppposite polarity contains a PNP transistor 81, emitter resistor 82, battery 83 provided with a ground tap 84, and a glow lamp 86. The base 87 of the transistor 81 is biased by resistors 88 and 89.

The input signal, $E_1$, is applied between terminal 91 and ground terminal 92. Terminal 91 is connected to by-passed resistor 93 to increase the frequency bandwidth, and then through resistors 94 and 96 to the bases 77 and 87. Two limiters are provided in the form of a pair of Zener diodes, 97 and 98, connected in series opposed relation.

In operation of the circuit of FIG. 5, the potentials and resistances are such that, in the absence of the signal $E_1$ both glow lamps 68 and 86 operate on the linear part of the characteristic and have positive resistances. Upon the application of a signal of either direct or alternating current between terminals 91 and 92 the base potentials are varied. When the base 77 potential is increased, the lamp 68 current is increased proportionally. When the potential is decreased the amount of decrease below ground is limited by the Zener diode 97 before the base 77 reaches such potential as to extinguish the lamp 68. The other lamp 86 is operated similarly on the other polarity or other half-cycle of $E_1$. Thus, within operating limits the currents through lamps 68 and 86 vary simultaneously in opposite directions, as do the light intensities emitted by them, so that the light differential is a linear function of the input signal $E_1$.

Thus the circuit of FIG. 5 behaves like that of the circuits of FIGS. 1 and 3, with the improvements noted. When the light intensities emitted by the lamps are applied to photoconductive cells in circuits such as depicted in FIGS. 1 and 4, the output $E_0$, obeys a linear equation similar to that of Equation 1.

In all of the circuits so far described, slow blackening of the glow lamp bulbs causes change in the scale constant. Additionally, ambient temperature changes may cause changes in the output signal accuracy. The circuit of FIG. 6 contains provision for neutralizing these errors and also contains means for further insuring linearity of glow lamp current with input signal.

In FIG. 6, transistors 99 and 101 comprise a differential amplifier having a common emitter resistor 102. Each emitter 103 and 104 also has its individual resistor 106 and 107. The sum of the two emitter currents is maintained reasonably constant in such a circuit. In the present instance additional constancy of emitter current is attained by the use of a transistor 108 having its collector-emitter circuit connected in series with resistor 102. The base 109 of the transistor 108 is biased by connecting it to the positive potential terminal 111 through a resistor 112, and to the negative potential terminal 113 through a pair of photoconductive cells 114 and 116 connected in parallel. These cells are similar to those described in connection with FIG. 1. Two glow lamps 117 and 118 similar to those heretofore described are connected between the transistor collectors 119 and 121 and the positive terminal 111. The transistor bases 122 and 123 are biased by resistors 124 and 125, and 126 and 127, respectively. The input signal $E_1$ is applied between terminal 128 and ground. The direct current source connected between terminals 111 and 113 contains an intermediate grounded tap as described in connection with FIG. 5. The base 123 is grounded through a resistor 129.

The circuit of FIG. 6 is designed to be used in conjunction with either a two-photoconductive-cell circuit as shown in FIG. 4 or a four-photoconductive-cell circuit as shown in FIG. 1. The latter use is indicated by the representation of two photoconductive cells, 28 and 31, illuminated by glow lamp 117, and by the representation of two other photoconductive cells, 29 and 32, illuminated by glow lamp 118.

In operation, when a signal is applied at terminal 128 raising the potential of base 122 by a certain amount, the action of the common resistor 102 causes the potential of base 123 to fall by a like amount. Thus current through lamp 117 is increased and that through lamp 118 is decreased by a like amount both because of the differential amplifier operation and because the transistor 108, if its base potential be maintained constant, has a constant collector current.

An additional control to neutralize bulb blackening error and also errors caused in photoconductive cells 28, 31, 29 and 32 by ambient temperature changes is effected by the photoconductive cells 114 and 116. This is particularly necessary when the 2-cell circuit of FIG. 4 is employed. Cell 114 is illuminated only by glow lamp 117 and 116 is illuminated only by glow lamp 118. In ordinary differential operation these cells 114 and 116 change in resistance in opposite directions by equal amounts, so that their parallel resistance remains constant. However, blackening of both lamps 117 and 118, or ambient temperature change, will change their resistance in the same sense and the parallel resistance will be changed in such direction as to tend to neutralize these errors.

What is claimed is:

1. A multiplying circuit comprising, a balanced bridge circuit having four arms joined at four junctions forming two conjugate pairs of terminals, a glow lamp connected in series with a ballast resistor in each of said four arms, a source of electric power connected to one of said two conjugate pairs of terminals, said power source energizing all of said glow lamps, a first signal source connected to the other of said two conjugate pairs of terminals, a second balanced bridge circuit having four arms joined at four junctions forming two conjugate pairs of terminals, a photoconductive cell connected in each arm of said second balanced bridge circuit, each photoconductive cell being positioned adjacent to a glow lamp whereby each lamp illuminates one and only one photoconductive cell, a second signal source connected to one of the two conjugate pairs of terminals of said second balanced bridge circuit, and a signal-receiving load connected to the other conjugate pair of terminals of said second balanced bridge circuit whereby the output potential developed across the load is directly and linearly proportional to the product of the amplitudes of said first and second signals, divided by a function of the potential of said source of electric power.

2. A multiplying circuit in accordance with claim 1 in which said electric power is a direct current power source.

3. A multiplying circuit in accordance with claim 1 in which said electric power is an alternating current power source.

4. A multiplying circuit in accordance with claim 1 in which a pair of glow lamps illuminates a pair of photoconductive cells and the signal relations are determined by the expression $$E_0 = \frac{E_1 E_2}{V}$$

in which $E_0$ is the output signal voltage, $E_1$ and $E_2$ are the first and second signals respectively, and $V$ is the voltage of the electric power source.

5. A multiplying circuit comprising, first and second direct-coupled amplifying stages each having an input and output circuit, a glow lamp in each output circuit, a direct-current source having a positive terminal connected to one of said glow lamps and a negative terminal connected to the other said glow lamp, a source of first input signals, means connecting said source to said two input circuits, a differential circuit containing a plurality of photoconductive cells positioned for illumination by said glow lamps, means applying second input signals to said differential circuit and means securing therefrom a signal proportional to the product of said first and second signals.

6. A multiplying circuit in accordance with claim 5 in which said first and second direct-coupled amplifying stages comprise respectively an NPN transistor stage and a PNP transistor stage.

7. A multiplying circuit comprising, a differential amplifier having two current paths joined in a common-mode resistor, a glow lamp respectively connected in each of said current paths, means applying an input signal to control one of said current paths whereby the other current path is differentially controlled, a pair of photoconductive cells connected in parallel to form a correction unit, each photoconductive cell being illuminated by a respective one of said glow lamps, a transistor having its collector-emitter circuit connected in series with said common-mode resistor, means connecting said correction unit to control the potential applied to the base of said transistor, and a photoconductive cell bridge circuit illuminated by said glow lamps.

References Cited in the file of this patent
UNITED STATES PATENTS

| | | |
|---|---|---|
| 2,431,696 | Keister | Dec. 2, 1947 |
| 2,841,329 | Statsinger | July 1, 1958 |
| 2,894,145 | Lehouec | July 7, 1959 |
| 3,014,135 | Hewlett et al. | Dec. 19, 1961 |